July 10, 1934.   H. F. VICKERS   1,965,867
AUTOMATIC FEED FOR MACHINE TOOLS AND THE LIKE
Filed Oct. 4, 1929   2 Sheets-Sheet 1
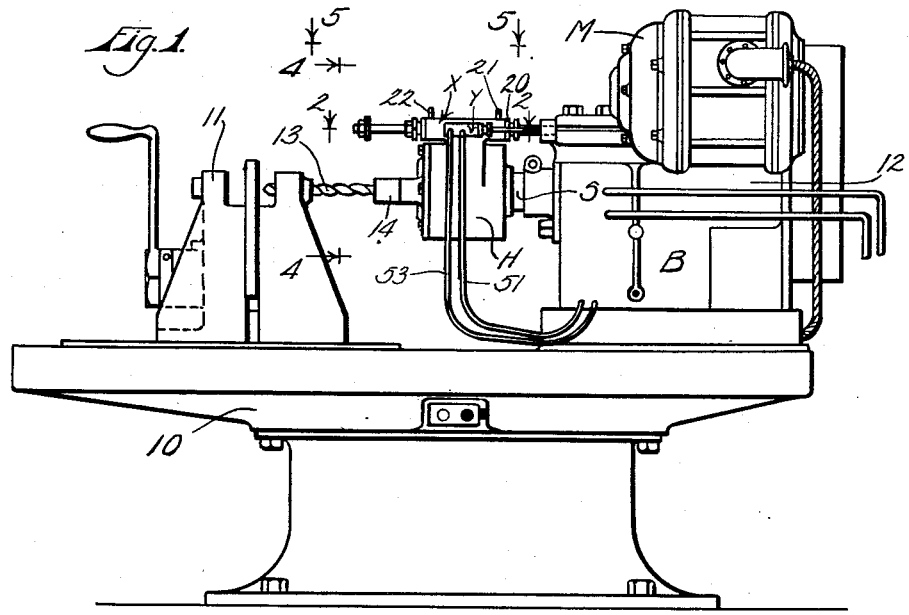
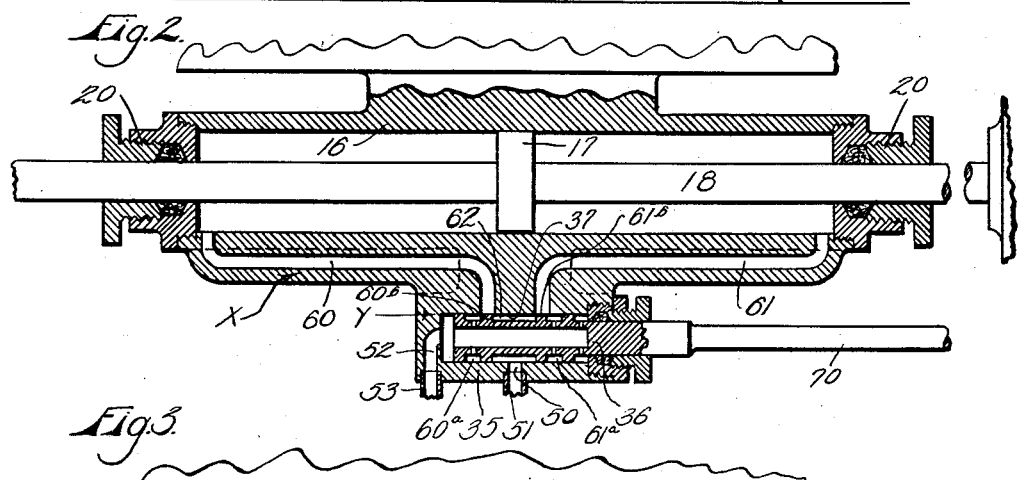
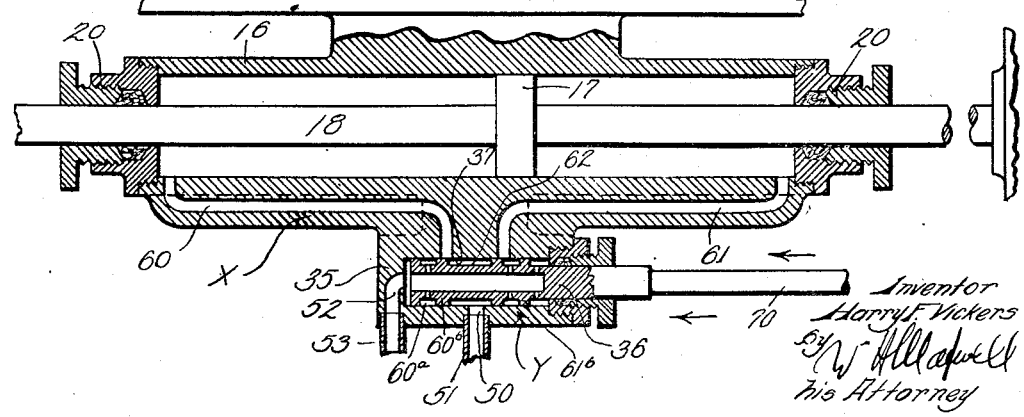
Inventor
Harry F. Vickers
his Attorney

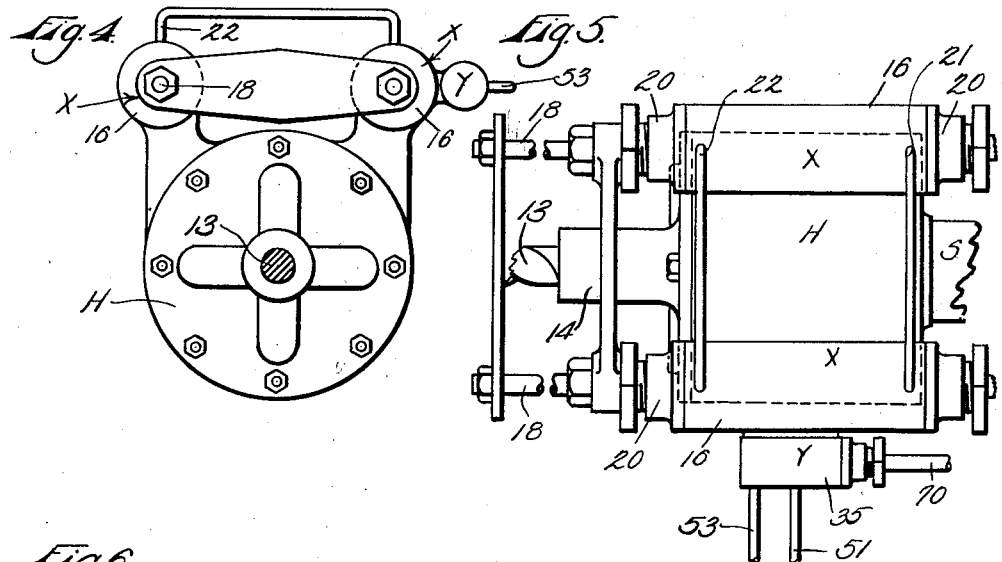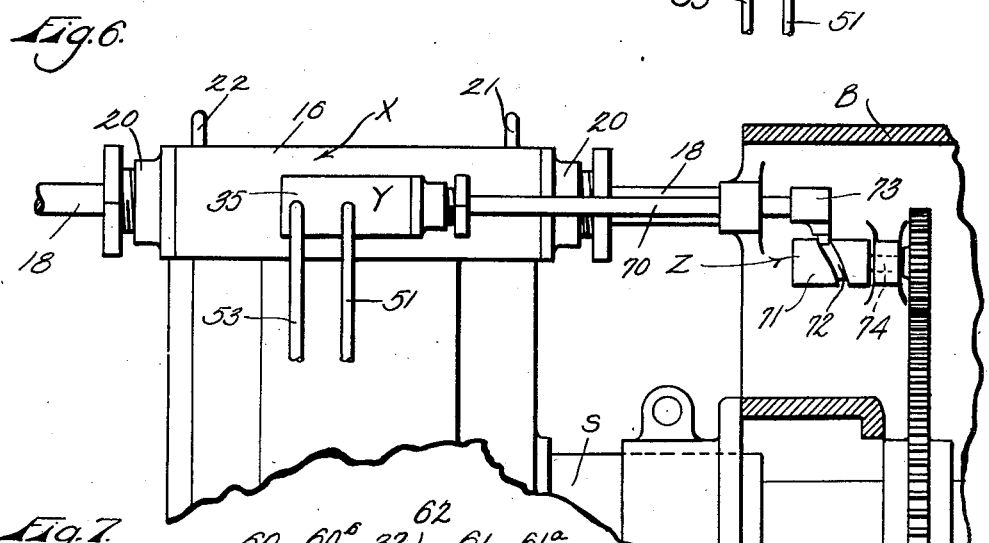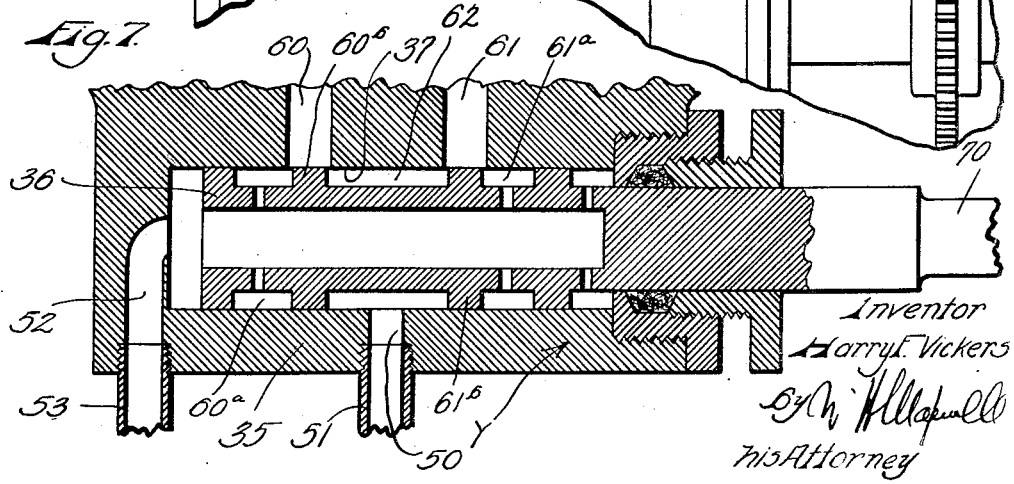

Patented July 10, 1934

1,965,867

UNITED STATES PATENT OFFICE 1,965,867

AUTOMATIC FEED FOR MACHINE TOOLS AND THE LIKE

Harry F. Vickers, Los Angeles, Calif.

Application October 4, 1929, Serial No. 397,264

6 Claims. (Cl. 77—32)

This invention has to do with an automatic feed for use in machine tools, and the like, and it is an object of the invention to provide a practical, accurate, and inexpensive fluid pressure actuated feed.

The present invention is useful, generally, for feeding or controlling movable elements such as carriages, heads, and like parts, found in numerous classes of machines and apparatus. The invention is particularly useful and practical as applied to machine tools. In applying the invention to machine tools it is useful in practically any of the many situations where the parts are now fed or controlled through mechanical means such as gear mechanisms, cam mechanisms, etc. For the purpose of facilitating an understanding of the invention I will make particular reference to a single typical application of the invention, it being understood that the present description is not to be construed as limiting or restricting the scope or range of application of the invention.

It is a general object of the present invention to provide a feed for a movable element whereby the element can be operated accurately and effectively at varying speeds or in either direction, the invention being such that the element being fed can be operated at various speeds when moving in a single direction and can be operated between a very slow speed and a very high speed.

It is another object of the present invention to provide a feed of the character mentioned which is extremely accurate in operation, being more accurate than mechanical feeds ordinarily involved in machine tools.

Another object of the present invention is to provide a feed of the character mentioned which is extremely simple and inexpensive of manufacture and such that it can be applied to machines in various manners so that it does not interfere with other parts or become cumbersome or inconvenient.

The various objects and features of my invention will be best and more fully understood from the following detailed description of a typical form and application of the invention, throughout which description reference is had to the accompanying drawings in which:

Fig. 1 is a view showing a machine tool particularly suited for operating a drill, or the like, and showing the feed provided by the present invention applied to the tool for operating the drill carrying head. Fig. 2 is an enlarged detailed sectional view showing a part of the mechanism, being a view taken as indicated by line 2—2 on Fig. 1, the parts being shown in the balanced or unactuated position. Fig. 3 is a view similar to Fig. 2 showing the parts in position where the feed is in operation in one direction. Fig. 4 is an enlarged end view of certain of the parts illustrated in Fig. 1, being a view taken as indicated by line 4—4 on Fig. 1. Fig. 5 is an enlarged plan view taken as indicated by line 5—5 on Fig. 1. Fig. 6 is an enlarged view illustrating the valve operating means of the feed, and Fig. 7 is an enlarged detail sectional view of the valve of the mechanism.

The machine tool illustrated in the drawings includes, generally, a base 10, a work holder 11 mounted on the base 10, and a machine head 12 on the base 10 for driving a tool, say, for instance, a drill 13, or the like. The machine head 12 includes, generally, a body B in the form of a housing, a motor M mounted on the body, a movable tool carrying head H supported from the body B through a spindle S so that it can be moved or reciprocated, etc. The machine head 12 includes a suitable driving connection between the motor M and the tool carrying head H whereby the tool holder 14 on the head is rotated. The drive is preferably through the spindle S. The present invention is not specifically concerned with the details of the machine tool to which it is applied; for instance, it is not concerned with the drive for rotating the tool holder 14, and therefore such details have been omitted from the present disclosure. Numerous forms of machine tools and types of drives are employed in machinery of this character and are familiar to those skilled in the art.

The present invention is concerned primarily with a feed means for operating the movable head H to feed a tool such as a drill 13, or the like, carried by the head H into and out of engagement with work in the holder 11. The present invention provides, generally, one or more fluid pressure actuated mechanisms X, a control valve Y for the mechanisms X, and means Z for automatically operating the control valve.

In the particular form and application of the invention illustrated in the drawings there are two cylinder and piston mechanisms X arranged parallel to each other and suitably spaced so that they brace and effectively operate the tool carrying head H. The cylinders 16 of the mechanisms X are fixed to, for instance, they may be formed on, the head H, and are parallel with the axis of movement of the head, that is, they are parallel with the spindle S. The pistons 17 of the mechanisms are slidably carried in the cylinders 16 and are fixed on rods 18 which project from the cylinders 16 and are connected with stationary parts, say, for instance, to the body B. In the form of the invention illustrated the rods 18 project from both ends of the cylinders through suitable packing glands 20. The rods 18 are fixed to the body B and therefore operate to hold the pistons 17 stationary or in fixed position. With this arrangement relative movement between the cylinders and pistons results in movement of the cylinders and therefore movement of the head H which is connected with the cylinders.

The valve Y constitutes control means for the mechanisms X operable to control the introduction and discharge of fluid under pressure to the ends of the cylinders. In practice I provide a single valve Y for the various mechanisms X employed to operate the head H. The valve Y may be directly connected with any one of the mechanisms X, in which case the corresponding ends of the mechanisms may be connected by conduits 21 and 22. The valve means Y includes, generally, a body 35 and a valve proper 36 operable in the body. The valve is preferably of the piston type, in which case the body 35 is in the nature of a cylinder having a bore 37 slidably carrying the valve 36. The body 35 of the valve is preferably stationary with the movable element of the mechanism X; for instance, it may be integral with the cylinder 16 as clearly illustrated in Figs. 2 and 3 of the drawings.

A fluid supply port 50 enters the middle portion of the body 35 and may be supplied with fluid under pressure through a flexible conduit 51. A fluid outlet port 52 is provided at one end of the body and connects with a suitable flexible conduit 53 provided for conducting fluid from the valve. It is to be understood that any suitable fluid under pressure, say, for instance, water or oil, may be supplied to the device through a conduit 51 at a suitable pressure and in a suitable quantity.

Cylinder ports 60 and 61 connect the bore 37 of the body with the two ends of the cylinder 16 of the mechanism X. The ports 60 and 61 communicate with the interior of the valve body at spaced points, preferably at points located at opposite directions from the fluid inlet port 50. The valve 36 has a central opening extending into it from the end adjacent the outlet port 52 and has a recess or chamber 62 formed in its exterior to remain in communication with the fluid supply port 50. Chambers 60$^a$ and 61$^a$ are formed in the exterior of the valve at points spaced from the chamber 62 to cooperate with the ports 60 and 61, respectively. The chambers 62, 60$^a$ and 61$^a$ are in the nature of recesses formed around the valve 36 and are proportioned and located so that the valve has parts 60$^b$ and 61$^b$ located over or opposite the ports 60 and 61, respectively. The chambers 60$^a$ and 61$^a$ are in communication with the central opening in the valve and are therefore in communication with the outlet port 52. The valve parts above described are proportioned and related so that the valve 36 may be positioned in a central or neutral position where the parts 60$^b$ and 61$^b$ are related to the ports 60 and 61, respectively, so that fluid under pressure received through the port 50 enters the ports 60 and 61 equally and as fast as it enters the ports it escapes to the chambers 60$^a$ and 61$^a$, discharging into the central opening of the valve and hence through the outlet port 52. Fig. 2 of the drawings illustrates the valve in the central or neutral position where the fluid is thus by-passed around the parts 60$^b$ and 61$^b$ leaving the mechanism balanced with equal pressure at the two sides of the pistons.

Movement of the valve 36 in either direction from the balanced or neutral position will immediately disturb the equilibrium or balanced condition at which the parts are all at rest and will cause more pressure to come on one side of the piston than the other with the result that the mechanism is operated by fluid pressure; for example, upon movement of the valve 36 in the direction indicated by the arrows in Fig. 3 the valve moves to the left in the body 35 allowing a greater amount of fluid from the chamber 62 to enter the port 60 than the port 61, or, if the movement is great enough, allowing all of the fluid to enter the port 60 while the port 61 is uncovered to the chamber 61$^a$, allowing free exhaust of fluid through the port 61 to the outlet port 52. With the valves thus moved to the left, fluid under pressure enters the cylinder 16 at the left-hand end of the piston 17 and is allowed to escape from the cylinder at the right-hand end of the piston with the result that the cylinder is moved by fluid pressure to the left with reference to the piston, or in the direction in which the valve 36 is moved. When the movement of the valve ceases, the fluid pressure acting on the mechanism in the manner just described will continue to move or operate the mechanism until it has moved the parts to the relative positioning shown in Fig. 2 where the parts are balanced, and no further movement takes place. If the valve is moved in the opposite direction, that is, to the right, the direction of flow is reversed from that above described with the result that the cylinders are moved to the right relative to the pistons. This movement likewise will continue until the valve stops, whereupon fluid pressure will actuate the parts until they are related, as shown in Fig. 2, where all parts are balanced and the mechanism remains at rest.

The means Z provided by the present invention for controlling the valve 36 operates to move the valve in a manner to cause the fluid pressure actuated mechanisms to move the head H in a definite predetermined manner. The means Z includes, generally, a mechanism for reciprocating the valve stem 70 in a predetermined manner, and in the preferred form of the invention it includes a cam mechanism. In the form of the invention illustrated the cam mechanism includes a revolving cam 71 having a cam slot or groove 72, and a cam follower 73 having a part operating in the groove 72. The cam 71 may be carried on and driven by a spindle 74 suitably operated from the drive within the body B; for instance, operated in definite speed relation to the tool carrier 14 on the head H. The cam follower 73 is fixed on the valve stem 70. The cam slot 72 in the cam 71 is generated or formed around the cam 71 to impart the desired reciprocatory motion to the valve stem 70. It will be obvious that the cam mechanism may be provided to operate the valve stem in any suitable manner, that is, in either direction and at various speeds either constant speeds or varying speeds; for example, in the case of operating a tool such as a drill, the cam may be made so that the head H moves to advance the drill against the work at the most advantageous speed and when the desired depth is reached or the drilling operation is completed, the head H may be returned rapidly preparatory to another operation. In practice, the head H fed by the fluid pressure acting through the mechanisms X will operate accurately in response to the valve Y. With the parts properly constructed and fitted, the head H can be controlled within a very small fraction of an inch, making the feed suitable for precision work.

Having described only a typical, preferred form and application of my invention, I do not wish to limit myself to the specific details set forth, but wish to reserve to myself any changes or variations that may appear to those skilled in the art or fall within the scope of the following claims:

Having described my invention, I claim:

1. In a machine tool, two relatively movable elements, one a tool holder, the other a work holder, drive means to rotate one of said elements, fluid pressure actuated feed means for causing reciprocation of one of said elements, a control valve controlling direction and rate of flow of fluid to the feed means and moving substantially with the reciprocated element and including a reciprocating part in constant timed driving relation with the drive means to have a definite time relation with the drive means whereby the flow of fluid through the control is determined by the difference between the movement of said part and the reciprocated element.

2. In a machine tool, two relatively movable elements, one a tool holder, the other a work holder, drive means to rotate one of said elements, fluid pressure actuated feed means for causing reciprocation of one of said elements, a control valve for controlling the speed and direction of flow of fluid to the feed means the valve being carried by and moving with the reciprocated element and including a reciprocating part in constant timed driving relation with the drive means whereby the flow of fluid through the control is determined by the difference between the movement of said part and the reciprocated element.

3. In a machine tool, two relatively movable elements, one a tool holder, the other a work holder, drive means to rotate one of said elements, fluid pressure actuated feed means for causing reciprocation of one of said elements, a control valve for the feed means including a valve part fixed to the reciprocated element and a movable valve part in constant driving and definite time relation with the drive means and cooperating with the first mentioned valve part whereby the flow of fluid through the control valve is determined by the difference between the movement of the last mentioned part and the reciprocated element.

4. In a machine tool, two elements, one to be rotated and one to be reciprocated, drive means for rotating one element, fluid pressure actuated means for reciprocating one element, a control for said pressure actuated means including, a valve element translated by the drive means in accordance with the desired reciprocatory movement to have a definite time relation with the drive means and a second valve element in fixed relation to the reciprocated element and related to the first mentioned valve element whereby the flow of fluid is controlled by the difference between the respective movements of said elements.

5. In a machine tool, two elements, one a work holder, the other a tool holder, drive means for rotating one element, a cylinder and piston mechanism for reciprocating one element, means for supplying operating fluid under pressure to said mechanism to cause reciprocation between the cylinder and piston, means for controlling the operating fluid for controlling the direction and speed of operation of said mechanism, and a direct positive operating connection between the said drive means and the fluid controlling means to operate the fluid controlling means in definite time relation to said drive means.

6. In a machine tool, two elements, one a work holder, the other a tool holder, drive means for rotating one element, cylinder and piston means for reciprocating the other element, the cylinder of said means being movable with said other element, means for supplying operating fluid under pressure to the cylinder to cause reciprocation of the said other element, and means for controlling the direction and rate of flow of the operating fluid under pressure to the cylinder, the last mentioned means including a valve element fixed to the reciprocated element, a movable valve element cooperating with the first mentioned valve element, and cam means actuated by the drive means for moving the movable valve element whereby the flow of operating fluid is controlled by the difference between the respective movements of said elements.

HARRY F. VICKERS.